United States Patent
Berzon

(10) Patent No.: US 8,647,711 B2
(45) Date of Patent: Feb. 11, 2014

(54) HIGH ADHESION ACRYLATE COATINGS FOR A PHOTOCHROMIC OPHTHALMIC LENS

(75) Inventor: Ronald Berzon, Saint Petersburg, FL (US)

(73) Assignee: Essilor International (Compagnie Generale d'Optique), Charenton-le-Pont (FR)

( * ) Notice: Subject to any disclaimer, the term of this patent is extended or adjusted under 35 U.S.C. 154(b) by 962 days.

(21) Appl. No.: 12/665,104

(22) PCT Filed: Jun. 18, 2008

(86) PCT No.: PCT/US2008/067350
§ 371 (c)(1),
(2), (4) Date: Dec. 17, 2009

(87) PCT Pub. No.: WO2008/157607
PCT Pub. Date: Dec. 24, 2008

(65) Prior Publication Data
US 2010/0189890 A1    Jul. 29, 2010

Related U.S. Application Data

(63) Continuation of application No. 11/820,751, filed on Jun. 20, 2007, now Pat. No. 7,759,433.

(51) Int. Cl.
*B05D 5/06* (2006.01)

(52) U.S. Cl.
USPC ............................ 427/164; 427/162; 427/165

(58) Field of Classification Search
USPC .......................................... 427/162, 164, 165
See application file for complete search history.

(56) References Cited

U.S. PATENT DOCUMENTS

| | | | |
|---|---|---|---|
| 4,643,730 A | | 2/1987 | Chen et al. |
| 4,836,960 A | * | 6/1989 | Spector et al. ................. 264/2.2 |
| 5,130,353 A | * | 7/1992 | Fischer et al. .................. 524/43 |
| 5,157,093 A | | 10/1992 | Harisiades et al. |
| 5,531,940 A | * | 7/1996 | Gupta et al. .................... 264/1.7 |
| 5,667,735 A | | 9/1997 | Bae et al. |
| 5,943,957 A | | 8/1999 | Mason |
| 6,180,043 B1 | | 1/2001 | Yonemochi et al. |
| 6,367,930 B1 | * | 4/2002 | Santelices et al. ........ 351/159.61 |
| 6,455,653 B1 | | 9/2002 | Nunez et al. |
| 6,676,877 B2 | | 1/2004 | Thompson |
| 6,869,981 B2 | | 3/2005 | Fewkes et al. |

(Continued)

FOREIGN PATENT DOCUMENTS

| | | |
|---|---|---|
| WO | WO95/15845 | 6/1995 |
| WO | WO 03/031138 | 4/2003 |
| WO | WO 2004/048068 | 6/2004 |

OTHER PUBLICATIONS

STN Search. Jul. 17, 2009.

(Continued)

*Primary Examiner* — Elizabeth Burkhart
(74) *Attorney, Agent, or Firm* — Keusey & Associates, P.C.

(57) ABSTRACT

A method and coating used to prepare a photochromically-enabled bifocal ophthalmic lens. The coating is a high adhesive strength acrylate-based coating that contains a small quantity of a polycarbonate-based TPU. The coating is applied to produce an intermediate imbibable bifocal surface. A photochromic solution is subsequently imbibed by contact with the bifocal surface.

13 Claims, 1 Drawing Sheet

(56) References Cited

U.S. PATENT DOCUMENTS

| | | | |
|---|---|---|---|
| 7,077,985 B2 | 7/2006 | Maki et al. | |
| 7,173,072 B2 | 2/2007 | Itai et al. | |
| 7,192,395 B1 | 3/2007 | Qu et al. | |
| 2003/0077425 A1* | 4/2003 | McBain et al. | 428/192 |
| 2003/0082344 A1 | 5/2003 | Straus et al. | |
| 2003/0090193 A1 | 5/2003 | Nojiri et al. | |
| 2003/0099809 A1 | 5/2003 | Straus et al. | |
| 2003/0152693 A1 | 8/2003 | Su et al. | |
| 2003/0227109 A1 | 12/2003 | Kitamura et al. | |
| 2004/0002729 A1 | 1/2004 | Zamore | |
| 2004/0127978 A1 | 7/2004 | Sparer et al. | |
| 2005/0089630 A1* | 4/2005 | Schlunt et al. | 427/162 |
| 2005/0245651 A1* | 11/2005 | Cooper | 524/270 |
| 2006/0118999 A1* | 6/2006 | Cooper et al. | 264/255 |
| 2006/0151911 A1 | 7/2006 | Zollner et al. | |
| 2007/0001327 A1* | 1/2007 | Chiu | 264/1.7 |
| 2007/0052922 A1* | 3/2007 | King et al. | 351/168 |
| 2007/0138665 A1* | 6/2007 | Chen et al. | 264/1.32 |
| 2007/0138667 A1* | 6/2007 | Dang et al. | 264/1.32 |

OTHER PUBLICATIONS

Office Action mailed Jul. 22, 2009, in U.S. Appl. No. 11/820,751, filed Jun. 20, 2007, now U.S. Patent No. 7,759,433, issued Jul. 20, 2010.
Sigma-Aldrich, Cobalt Naphthenate, 6 pages, Jan. 2006.
Sigma-Aldrich, Luperox P, 6 pages, Jan. 2006.
Lubrizol Advanced Materials, Inc., Estane Carbothane 3575A, 1 page, Jun. 2007.
Cytec Surface Specialties, Ebecryl 284-N, 2 pages, Jun. 2006.
Cytec Surface Specialties, Ebercryl 1290, 12 pages, May 2006.
Cytec Surface Specialties, Ebercryl 8402, 2 pages, Jun. 2006.
Cytec Surface Specialties, Ebercryl 8411, 2 pages, Aug. 2006.
CVC Specialty Chemicals, Inc., Epalloy 7138, 1 page, Nov. 2004.
Sartomer Company, Inc., SR238, 1 page, Dec. 1998.
Sartomer Company, Inc., SR252, 1 page, Nov. 1998.
Sartomer Company, Inc., SR259, 1 page, Nov. 1998.
Sartomer Company, Inc., SR268, 1 page, Jun. 1997.
Sartomer Company, Inc., SR340, 1 page, Jun. 1997.
Sartomer Company, Inc., SR348, 1 page, Dec. 2001.
Sartomer Company, Inc., SR349, 1 page, Jan. 1999.
Sartomer Company, Inc., SR399, 1 page, Nov. 1998.
Sartomer Company, Inc., SR506, 1 page, Dec. 1998.
Sartomer Company, Inc., SR603, 1 page, Dec. 1998.
Sartomer Company, Inc., SR740, 1 page, Feb. 2006.
Sartomer Company, Inc., CD540, 1 page, Oct. 1998.
Sartomer Company, Inc., CD541, 1 page, Oct. 1998.
Sartomer Company, Inc., CD542, 1 page, Oct. 1998.
Sartomer Company, Inc., CD146, 1 page, Jul. 2003.
Sartomer Company, Inc., CD965, 1 page, Aug. 2003.
Sartomer Company, Inc., CN991, 1 page, Mar. 2004.
Sartomer Company, Inc., CN2258, 1 page, Aug. 2003.
Sartomer Company, Inc., CN2259, 1 page, Aug. 2003.
Sartomer Company, Inc., CN2300, 1 page, Mar. 2006.
Sartomer Company, Inc., CN2301, 1 page, Apr. 2006.
Sartomer Company, Inc., CN2302, 1 page, Mar. 2006.
Ciba Specialty Chemicals, Inc., EFKA 3034, 2 pages, May 2005.
LARS Pipping:, Written Opinion of the ISA by EPO; 11 pages; Dec. 23, 2008.

* cited by examiner

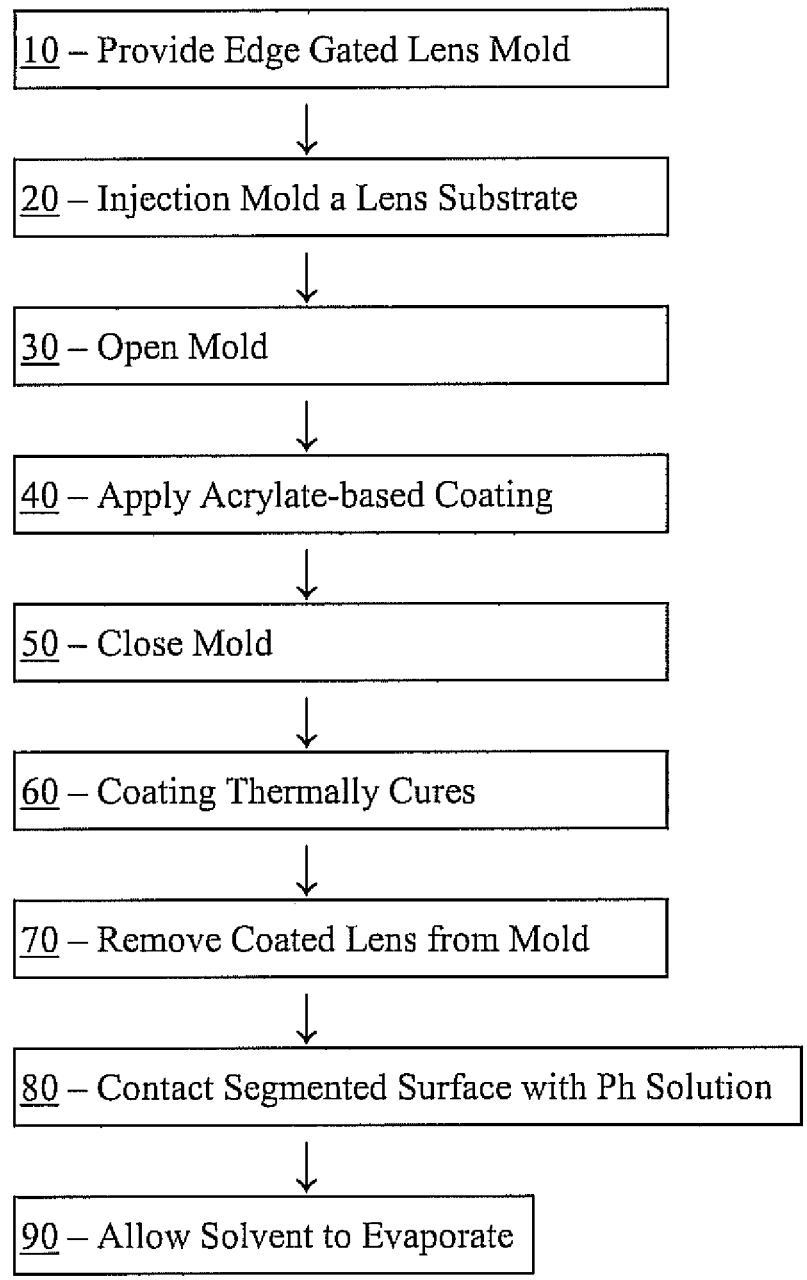

HIGH ADHESION ACRYLATE COATINGS FOR A PHOTOCHROMIC OPHTHALMIC LENS

CROSS-REFERENCE TO RELATED APPLICATIONS

This application is the U.S. National Stage of International Stage PCT Application No. PCT/US2008/067350 filed Jun. 18, 2008, which is a continuation of U.S. patent application Ser. No. 11/820,751, filed Jun. 20, 2007, now U.S. Pat. No. 7,759,431.

BACKGROUND OF THE INVENTION

1. Field of the Invention

The invention relates to a high adhesive strength acrylate-based coating that contains a small quantity of a polycarbonate-based TPU. More particularly, the coating is applied to produce an intermediate imbibable bifocal surface that is subsequently contacted with a photochromic solution.

2. Description of the Related Art

In-situ coating via direct injection, so called in-mold coating, has been successfully used in other industries such as automotive, construction, office products and outdoor equipment industries. It was originally developed to improve the surface appearance of sheet molding compound (SMC) parts molded by compression molding. In more recent years it's been applied to injection molded thermoplastic parts.

U.S. Patent Application Publication 2003/0227109 refers to a process for compressive decoration molding applied to the exterior of an injection molded box. The resulting decorative film is a coating along the top and sides of the box, that is, on surfaces perpendicular to the mold parting line. The high viscosity opaque coating is compressed at a controlled rate to provide uniform thickness on all part surfaces. The publication is directed to solving a problem of specific product configuration and does not relate to forming ophthalmic lenses which require optical clarity and varying thickness.

U.S. Patent Application Publication 2006/0151911 describes an injection molded part that is coated with a lacquer layer. The lacquer is injected under pressure into a closed mold that is treated with a mold release agent. Solvent free lacquers with short shelf lives are prescribed through implementation of a reaction injection molding (RIM) process. The injected lacquer is cured at an elevated pressure, whereby the coating expands and then shrinks, making it difficult to control final coating thickness.

U.S. Patent Application Publication 2005/0089630 describes a lens made by a first process which is then gasketed to receive a surface cast layer. The original lens must be cleaned and dried in order to apply a tie coating before gasketing. The tie coating is also subject to a pre-cure to partially polymerize the coating to improve its ability to tie the original lens to the cast layer. The described compositions and methods suffer from complexity and too many steps.

U.S. Patent Application Publication 2006/0118999 describes a simultaneous molding/overmolding technique utilizing a reversibly engageable rotatable core having identical molds on multiple sides. The technique is designed to allow the molding process to occur on one core side at the same time as the overmolding process takes place on another core side. The parallel molds are not well suited for producing articles of optical quality because the hardware configuration does not allow for interchangeable mold inserts that are needed to produce lenses having different base curves. In addition, since one clamp is used to close both parallel molds, there is only a single clamp force profile which represents a compromise between the two distinct types of molding operations.

U.S. Pat. No. 7,077,985 describes a film insert molding process for adding photochromic or polarizing functionality to an injection molded lens. The functional film is sandwiched between two protective polymeric layers and pre-shaped before being placed into the bifocal injection mold cavity. The preparation of the film involves multiple steps and requires additional resources to keep the film inventory clean prior to use. U.S. Pat. No. 6,367,930 describes a separately prepared photochromic TPU film and a polycarbonate ply that are collectively inserted into a mold for a film insert process. In an alternate embodiment, a photochromic TPU that is injected, for example via two injection molding machines or a two-shot injection molding machine. In these processes, an intermediate imbibable bifocal lens is not prepared.

This closed mold method of in-mold coating has an advantage, in that the coating is able to cure at the same time as the part is cooling. Since access to the part is limited by the closed mold, all of these systems introduce the coating at the top of the mold cavity with the coating injector being located near the parting line. The preferred molding machine configurations having a vertical parting line, with the movable mold half being reciprocated in a horizontal direction. An example of such machine configuration can be readily seen in U.S. Pat. No. 6,180,043. This patent is concerned with high gloss, opaque coatings, containing as much as 30% and up to 45% titanium dioxide and other pigments. Clearly, for such coatings in which one sees only a highly reflective outer surface, there is no requirement for uniformity or transparency, as with an optical coating. In addition, mold cleanliness and contamination are not issues due to the higher viscosity of pigmented coatings. U.S. Pat. No. 6,180,043 utilizes multistage declining clamping force during the coating cure stage, while WO 2003/031138 utilizes multistage declining clamping force during the plastic injection stage.

The remaining closed mold patents describe various molding machine modifications to contain the coating within the mold cavity. U.S. Pat. No. 6,676,877 provides a coating containment shroud along the runner passageway to prevent coating solution from contaminating the liquid resin in the screw. The International Publication WO 2004/048068 relates to retrofitting existing molds for use with an in-mold coating system. Published U.S. Patent Application 2003/0077425, Published U.S. Patent Application 2003/0082344 (corresponding to International Publication WO 2003/035354), and Published U.S. Patent Application 2003/0099809 all relate to the addition of a rim feature on the molded item, to seal the parting line and prevent coating solution leakage. While these solutions are adequate for center-gated molds and automobile parts, they are unsuitable for the use in edge-gated molds or the product configuration of optical lenses.

U.S. Pat. No. 5,943,957 discloses a method for pad printing inked images onto injection-molded pieces while they are still in the mold. The patented method relates to conventional ink that air dries, and does not involve an optical grade coating that will be spread over the lens by re-clamping the mold inserts and allowing the coating to cure via the retained heat in the mold block. Published U.S. Patent Application 2003/0152693 discloses pad printing of lenses, but applies a UV or microwave curable coating on cast lenses which are totally divorced from any mold contact.

The present invention describes equipment and provides methods and formulation to apply a coating or thicker layer on the surface of an ophthalmic lens while it is still in the mold. The coating is thermally cured by the heat from the mold and the residual heat from the thermoplastic lens to provide an imbibable bifocal surface. In order to address adhesion and performance defects, the formulations of the invention include fractional amounts of a TPU in an acrylate-based thermoset formulation.

SUMMARY OF THE INVENTION

It is an object of the present invention to provide an in-mold coating process that produces an imbibable segmented optical lens.

It is a further object to specify a TPU component to the coating formulation to enhance adhesion and offer good photochromic performance.

These and other related objects are achieved by an embodiment of the invention which includes a method for forming a photochromically-enabled bifocal ophthalmic lens by incorporating a thermoplastic polyurethane (TPU) therein. Initially, molten thermoplastic polycarbonate (PC) resin is injected into an edge-gated cavity of an injection molding machine having a vertical equipment axis to provide a lens substrate. An acrylate-based coating composition is applied onto the lens substrate which cures to form an imbibable bifocal surface. In a subsequent operation, a photochromic dye solution is imbibed into the surface. The acrylate-based composition contains an adhesion enhancer comprising a TPU so that coating-to-substrate integrity is maintained following said imbibing step.

The injecting step provides a single vision (SV) lens substrate, and the applying step involves overmolding. The applying step includes depositing an unpressurized full metered charge of the composition on to the upwardly-facing convex surface of the lens substrate, and then clamping down an upper mold half to form a bifocal lens cavity. Alternatively, the injecting step provides a bifocal lens substrate.

The coating composition includes at least 90% by weight of a blend acrylate-based thermoset materials, and less than 5 phm TPU (parts per hundred parts of monomers), and preferably less than 2 phm. For the imbibable version, the coating may comprise at least one dye selected from regular dye, photochromic dye, dichroic dye or combination thereof, or the coating composition is devoid of any dyes. The TPU is a polycarbonate-based TPU, for example an aliphatic polycarbonate-based TPU. The resulting photochromically-enabled bifocal ophtalmic lens may have an % T initial above 80 a % T dark around 20. The coating composition is formulated by dissolving a metal salt and the TPU in a solvent blend including (1) a monofunctional (meth)acrylate; (2) a multifunctional (meth)acrylate; (3) a difunctional (meth)acrylate; (4) an aliphatic urethane diacrylate; and adding an initiator. The coating composition may optionally comprise a dye which is selected from regular dye, photochromic dye, dichroic dye and combination thereof. This option provides the availability to modify and adjust the final tint of the lens manufactured by this process.

According to the invention, a composition is described as an imbibable thermoset composition. By imbibable, it is understood that the composition may be subject, after a thermal curing step according to the method of the invention, to an imbibing process without formation of defects onto the lens and the coating itself. Then it may be understood that an imbibable composition may be clear, or comprise at least one dye. If said imbibable composition comprises dye, then it is possible if needed to subject the lens obtained after the curing step to an imbibing step to obtain, for example, a lens with a low level of transmission (darkener) and/or to modify the tint.

Then the composition of the invention is a thermoset composition having (1) at least one monofunctional (meth)acrylate; (2) at least one multifunctional (meth)acrylate; (3) at least one difunctional (meth)acrylate; (4) at least one aliphatic urethane diacrylate; (5) at least one metal salt; (6) at least one initiator; and (7) at least one thermoplastic polyurethane (TPU). As mentioned above, the thermoset composition may further comprise one dye selected from regular dye, photochromic dye, dichroic dye and a combination thereof.

The monofunctional (meth)acrylate may be isobornyl acrylate, methyl methacrylate, benzyl methacrylate, benzyl acrylate, hydroxypropyl methacrylate, 2-phenoxyethyl methacrylate, or combinations thereof. The monofunctional (meth)acrylate is benzyl acrylate, for example.

The multifunctional (meth)acrylate may be dipentaerythritol hexaacrylate, dipentaerythritol pentaacrylate, and hexafunctional aliphatic urethane acrylate, or combinations thereof. The multifunctional (meth)acrylate is dipentaerythitol pentaacrylate, for example.

The difunctional (meth)acrylate may be 1,6-hexanediol diacrylate, ethoxylated bisphenol A di(meth)acrylate, polyethylene glycol di(meth)acrylate or combinations thereof. The metal salt is cobalt naphthenate, for example. The initiator is tert-butylperoxybenzoate, for example.

The thermoplastic polyurethane includes a polycarbonate-based aliphatic polyurethane having a Specific gravity of between 1.0 and 1.3; a Flexural modulus between 550 and of 690 psi; an Ultimate Tensile of between 4,000 and 6,000 psi; and Mold shrinkage of 0.006-0.014 in/in.

The monofunctional (meth)acrylate is present in an amount of about 5% to 40% by weight, preferably 10 to 20%. The multifunctional (meth)acrylate is present in an amount of about 5% to 50% by weight, preferably 10 to 35%. The difunctional (meth)acrylate is present in an amount of about 5% to 50% by weight, preferably 10 to 35%. The aliphatic urethane diacrylate is present in an amount of about 5% to 60% by weight, preferably 30 to 50%. The metal salt is present in an amount about 0.05 to 2.0 phm, preferably about 0.25 phm. The initiator is present in an amount of about 0.1 to 5.0 phm, preferably about 1.5 phm. The thermoplastic polyurethane (TPU) is present in an amount of about 0.5 phm to 5.0 phm, preferably about 1.0 phm. The composition may further comprise at least one dye being present in an amount comprised from 0.1% to 5.0% by weight.

BRIEF DESCRIPTION OF THE DRAWINGS

The advantages, nature, and various additional features of the invention will appear more fully upon consideration of the illustrative embodiments now to be described in detail in connection with accompanying drawings. In the drawings:

The FIG. 1 is a flowchart outlining the steps for applying an acrylate-based coating to manufacture an imbibable surface that is treated to create a photochromic lens.

DETAILED DESCRIPTION OF PREFERRED EMBODIMENTS

The present invention provides methods and coatings used to prepare a photochromically-enabled segmented ophthalmic lens. The coating is a high adhesive strength acrylate-based coating that contains a small quantity of a polycarbonate-based TPU. The coating is applied to produce an intermediate imbibable bifocal or trifocal surface. A photochromic solution is subsequently imbibed by contact with the segmented surface.

Currently, when manufacturing photochromic polycarbonate bifocal segmented spectacle lenses, a viscous photochromic coating is deposited onto the segmented surface. The surface discontinuity causes the coating to build-up at the segment. When dried, such a lens has an excessive amount of photochromic dye present at the segment. During use in sunlight, UV radiation causes an undesirable darker color at the segment.

One proposed solution involves an in-mold application of an imbibable coating on to the bifocal surface. The coating has a favorable uniform thickness which would be well suited for imbibing with a photochromic dye solution. Unfortunately, the solution has the effect of deteriorating the coating, and such photochromically dyed coatings routinely fail basic adhesion tests.

Aside from film insert molding techniques, attempts have been made to incorporate the photochromic dye into the coating for in-mold application. However, the photochromic dye molecules are unstable at high temperatures, and therefore this approach limits the parameters for processing high temperature resins. In addition, the coating layer depth, and hence the dye gradient, cannot be effectively controlled or varied.

Surprisingly, it was discovered that an imbibable coating layer could be applied with an in-mold technique, and could be engineered to provide high adhesion strength by adding a fractional percentage of TPU. The imbibable coating layer is applied via an in-mold process, which will be further explained with reference to the FIG. 1.

Beginning in step 10, there is provided an edge-gated lens mold. The mold is oriented to a vertical equipment axis. The stationary mold section is designated as the lower convex mold half. The movable mold section is designated as the upper concave mold half. The upper movable mold half is vertically, and reciprocally translated by a multi-ton clamping unit, for example a clamping unit on the order of 100 tons. In step 20, we injection mold a lens substrate. A molten thermoplastic polycarbonate (PC) resin is injected into the cavity at typical pressures and temperatures in the range of 300-400 degrees Fahrenheit.

In step 30, the mold is opened with the convex surface of the lens substrate facing up. The mold is opened at a time when the resin is sufficiently solidified to resist deformation. In step 40 an acrylate-based coating is applied to the substrate. The coating is a thermoset resin containing a fractional amount of a polycarbonate-based thermoplastic polyurethane (TPU). An unpressurized full metered charge of coating is applied in step 40. The mold is closed in step 50 to spread the coating across the substrate surface. The same clamp force from step 20 may be employed. Alternately, a reduced clamp force may be employed. The same [bifocal] mold halves from step 20 may be employed, in which case the coating will occupy a thin volume of space created by shrinkage of the PC resin. If a single vision [SV] mold set is used in step 20, the top mold half will be swapped out and substituted with a bifocal upper mold, having a base curve similar to the SV mold set.

In either case, in step 60 the coating thermally cures to form an imbibable segmented lens surface. Residual heat from the lens substrate or the mold surfaces drives the thermal cure process. The lens may be a bifocal type or a trifocal type. In step 70 the mold is opened and the lens is removed. The coated lens will be removed at a time when the coating has sufficiently cured to resist deformation. In step 80, the imbibable segmented lens surface is contacted with a photochromic [Ph] solution. This step involves the introduction of heat according to a predetermined profile. In step 90 the solvent from the Ph solution is allowed to evaporate. This drying step may also involve the introduction of heat. The resulting product is a photochromically enabled segmented [bifocal or trifocal] lens featuring a high adhesion strength coating. The lens has good photochromic performance. Experiments and test results which quantify the adhesion strength and photochromic performance are presented below.

The examples and tests are presented in three sections, namely, I. Coatings which fail adhesion, II. Coatings which pass adhesion, but fail photochromic performance, and III. Coatings which pass adhesion and photochromic performance.

Coating adhesion performance was tested by a cross-hatch adhesion technique where a parallel evenly spaced series of sharp razor blades are run across the coating and then run across the coating again at a 90° angle. Tape is applied and pulled and the coating is examined to see if the coating remains on the lens or has been removed. This is known as Adhesion-Dry. The coated lens was then placed into boiling water or aqueous red dye solution and tested again, which is called Adhesion-Wet. Initially, the un-imbibed lenses were tested for Adhesion-Dry. If they survived they were tested for Adhesion-Wet. If the coating was still intact they were imbibed with a photochromic solution and tested for photochromic performance. After that, they were tested for Adhesion-Dry. If the coating was still intact the lens was tested for Adhesion-Wet.

I. First Example Set

A standard coating formulation example 1 is described below in Table 1. Cobalt naphthenate was carefully weighed out into a vial. The SR506 was then added which is primarily used to dissolve the cobalt naphthenate and control viscosity. The vial was lightly heated and gently swirled to dissolve the cobalt napthenate quickly. CD542 was added then SR399 was added and mixed thoroughly. CN965 was then added and mixed until dissolved. The organic peroxide Luperox P was added last and mixed well. The solution was degassed using a vacuum pump.

Example 2 is the same as example 1 except that SR506 was replaced by SR340 and CD542 was replaced by SR603. SR340 does not dissolve cobalt naphthenate very well.

Both example fail adhesion after imbibing with photochromics however, the photochromic performance is good.

TABLE 1

Adhesion Performance

| | Sample | |
|---|---|---|
| | 1 | 2 |
| cobalt naphthenate (phm) | 0.25 | 0.25 |
| SR506: isobornyl acrylate (%) | 20 | — |
| SR340: 2-phenoxyethylmethacrylate (%) | — | 20 |
| CD542: BPA (8EO) DMA (%) | 30 | — |
| SR603: PEG (400) DMA (%) | — | 30 |
| SR399: dipentaerythritol pentaacrylate (%) | 20 | 20 |
| CN965: Urethane diacrylate (%) | 30 | 30 |
| Luperox P: t-butylperoxybenzoate (phm) | 1.5 | 1.5 |
| Adhesion without imbibing photochromics | | |
| Dry | PASS | PASS |
| Wet | PASS | PASS |
| Adhesion after imbibing photochromics | | |
| Dry | PASS | PASS |
| Wet | fail | fail |
| Photochromic Performance | | |
| % T initial | 83.0 | 83.9 |
| % T dark | 22.0 | 19.8 |

Cobalt Naphthenate may be obtained from Sigma-Aldrich located in St. Louis, Mo. It has CAS No. 61789-51-3 and contains up to 10% cobalt, CAS No. 7440-84-4. It is also referred to as Naftolite.

SR-506 is the trade name for isobornyl acrylate available from Sartomer Company, Inc. of Exton, Pa. It has the following molecular diagram Inhibitor of 175 MEHQ ppm; Solvent of 0.1% wt.; Water of 0.2% wt.; Acid of 0.1% wt.; Color of 40 APHA; Specific gravity of 1.119 @ 25 degrees C.; Viscosity of 420 cps at 25 degrees C.; Refractive Index of 1.5147; and a Molecular Weight of 728.

SR-603 is the trade name for polyethylene glycol (400) dimethacrylate available from Sartomer Company, Inc. of Exton, Pa. It has the following molecular diagram

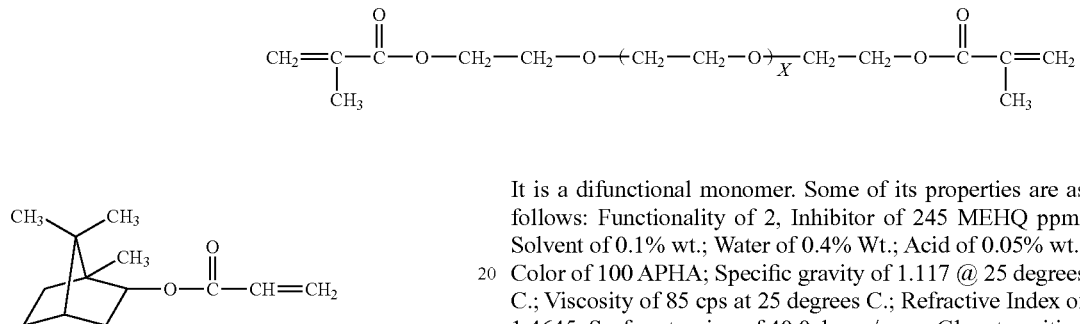

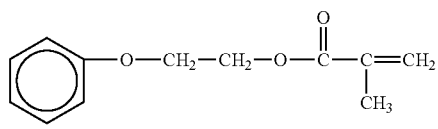

Some of its properties are as follows: Functionality of 1, Inhibitor of 170 MEHQ ppm; Water of 0.05% wt.; Acid of 0.1% wt.; Color of 20 APHA; Specific gravity of 0.987 @ 25 degrees Celsius, Viscosity of 9 cps @ 25 degrees Celsius; Refractive Index of 1.4738; Surface tension of 31.7 dynes/cm; a Glass transition ($T_g$) temperature of 88 degrees Celsius; Boiling Point of 120 degrees Celsius @ 15 mm; Flash Point of 106 degrees Celsius; and a Molecular Weight of 208.

SR-340 is the trade name for 2-phenoxyethyl methacrylate, a low volatility monofunctional, aromatic monomer offering good adhesion properties, available from Sartomer Company, Inc. of Exton, Pa. It's molecular diagram is represented as follows:

It is a difunctional monomer. Some of its properties are as follows: Functionality of 2, Inhibitor of 245 MEHQ ppm; Solvent of 0.1% wt.; Water of 0.4% Wt.; Acid of 0.05% wt.; Color of 100 APHA; Specific gravity of 1.117 @ 25 degrees C.; Viscosity of 85 cps at 25 degrees C.; Refractive Index of 1.4645; Surface tension of 40.0 dynes/cm; a Glass transition ($T_g$) temperature of −21 degrees C.; and a Molecular Weight of 598.

SR-399 is the trade name for dipentaerythritol pentaacrylate available from Sartomer Company, Inc. of Exton, Pa. It's molecular diagram is represented as follows:

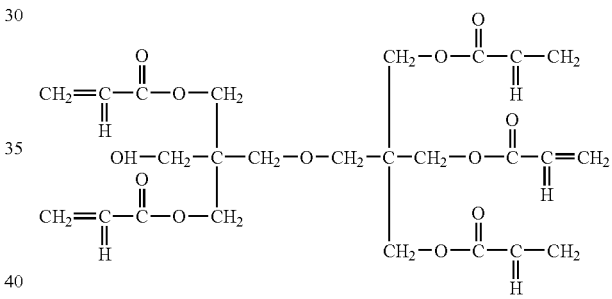

Some of its properties are as follows: Functionality of 1, Inhibitor or 125 HQ ppm; Solvent of 0.1% wt.; Water of 0.2% wt.; Acid of 0.1% wt.; Color of 40 APHA; Specific gravity of 1.079 @ 25 degrees C.; Viscosity of 10 cps at 25 degrees C.; Refractive Index of 1.5109; Surface Tension of 38.2 dynes/cm.; Glass Transition ($T_g$) temperature, of 54 degrees C.; Molecular Weight of 206, and a Boiling point of 260 degrees C. @ 760 mm.

CD-542 is the trade name of an ethoxylated (8) bisphenol A dimethacrylate available from Sartomer Company, Inc. of Exton, Pa. It has the following molecular diagram Some of its properties are as follows: Functionality of 5, Inhibitor of 270 MEHQ ppm; Solvent of 0.1% wt.; Water of 0.1% wt.; Acid of 0.1% wt.; Color of 50 APHA; Specific gravity of 1.192 @ 25 degrees C.; Viscosity of 13,600 cps at 25 degrees C.; Refractive Index of 1.4885; Surface Tension of 39.9 dynes/cm.; Glass Transition Temperature, $T_g$ of 90 degrees C.; and a Molecular Weight of 525.

CN-965 is the trade name of an aliphatic polyester based urethane diacrylate oligomer. It is a flexible oligomer available from Sartomer Company, Inc. located in Exton, Pa. Some of its properties are: Color, APHA of 50; Density of 9.144 lbs./gal.; Elongation of 57; Functionality of 2; Modulus

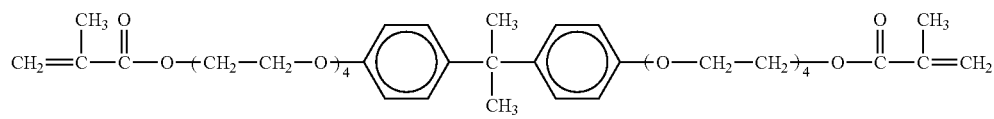

It is a low volatility monomer used in free radical polymerization. It provides a good hydrophobic and hydrophilic balance. It has a hydrophobic backbone for alkali solubility. Some of its properties are as follows: Functionality of 2, of 3040 psi @ 1%; Refractive index 25' of 1.4802; Glass Transition (Tg) temperature of −37 degrees C.; and a Viscosity of 9975 cps @ 60 degrees C. It exhibits good adhesion, good chemical resistance, good heat resistance, good water resistance, good weatherability, high abrasion resistance, high flexibility, high impact strength and low shrinkage.

Luperox P is the trade name for tert-butyl peroxybenzoate, 98% available from Sigma-Aldrich of St. Louis, Mo. It has CAS No. 614-45-9 and the formula $C_{11}H_{14}O_3$. It is also referred to as t-butyl perbenzoate, t-butyl peroxy benzoate, Esperox 10, Novox, Trigonox C, and tert-butyl perbenzoate. Some of its properties are as follows: Molecular weight of 194.23 AMU; BP/BP range of 75.0-76.0 degrees C. at 0.2 mmHg; Vapor pressure of 3.36 mmHg at 50 degrees C.; Vapor Density of 6.7 g/l; SG/Density of 1.034 $g/cm^3$; Volatility of 100%; Flash point of 93 degrees C.; and a Refractive Index of 1.496.

Example 3 is the same as 2 except that SR506 was replaced by CN146 which is described as an adhesion promoter. CN146 dissolve the cobalt naphthenate very quickly. Again in Table 2 below, 3 fails adhesion after imbibing but has good photochromic performances.

TABLE 2

Adhesion Performance

| | Sample 3 |
|---|---|
| cobalt naphthenate (phm) | 0.25 |
| CN146: acrylic oligomer (%) | 20 |
| SR603: PEG (400) DMA (%) | 30 |
| SR399: dipentaerythritol pentaacrylate (%) | 20 |
| CN965: Urethane diacrylate (%) | 30 |
| Luperox P: t-butylperoxybenzoate (phm) | 1.5 |
| Adhesion without imbibing photochromics | |
| Dry | PASS |
| Wet | PASS |
| Adhesion after imbibing photochromics | |
| Dry | PASS |
| Wet | fail |
| Photochromic Performance | |
| % T initial | 82.1 |
| % T dark | 20.2 |

CN-146 is the trade name of an acrylic oligomer. It is an adhesive oligomer available from Sartomer Company, Inc. located in Exton, Pa. Some of its properties are: Appearance of a clear liquid @ 20 degrees Celsius; Specific gravity of 1.26 @ 25 degrees Celsius; and a Viscosity of 3600 cps @ 25 degrees Celsius. It exhibits good adhesion to metal and plastics, low viscosity and is soluble in caustic solutions.

Polar monomers are known to enhance adhesion. Examples 4 containing HEMA (hydroxyl groups) and 5 containing acrylic acid (acid groups). Both HEMA and MMA/AA dissolve the cobalt naphthenate very quickly. Both fail dry adhesion after imbibing as shown in Table 3 below but have good photochromic performance.

TABLE 3

Adhesion Performance

| | Sample | |
|---|---|---|
| | 4 | 5 |
| cobalt naphthenate (phm) | 0.25 | 0.25 |
| MMA: methylmethacrylate (%) | — | 10 |
| HEMA: 2-hydroxyethylmethacrylate (%) | 20 | — |
| AA: acrylic acid (%) | — | 10 |
| SR603: PEG (400) DMA (%) | 30 | 30 |
| SR399: dipentaerythritol pentaacrylate (%) | 20 | 20 |
| CN965: Urethane diacrylate (%) | 30 | 30 |
| Luperox P: t-butylperoxybenzoate (phm) | 1.5 | 1.5 |
| Adhesion without imbibing photochromics | | |
| Dry | PASS | PASS |
| Wet | PASS | PASS |
| Adhesion after imbibing photochromics | | |
| Dry | fail | fail |
| Wet | na | na |
| Photochromic Performance | | |
| % T initial | 84.1 | 83.6 |
| % T dark | 21.9 | 20.9 |

II. Second Example Set

Examples 6, 7 and 8 are the same as example 1 except that CN965 has been replaced by the appropriate Ebecryl monomer shown in Table 4.

While 6 and 7 both pass adhesion after imbibing as shown in Table 4 below, the photochromic performance is unacceptable with 6 only darkening to 47% T. Example 8 does not even imbibe or darken.

TABLE 4

Adhesion Performance

| | Sample | | |
|---|---|---|---|
| | 6 | 7 | 8 |
| cobalt naphthenate (phm) | 0.25 | 0.25 | 0.25 |
| SR506: isobornyl acrylate (%) | 20 | 20 | 20 |
| CD542: BPA (8EO) DMA (%) | 30 | 30 | 30 |
| SR399: dipentaerythritol pentaacrylate (%) | 20 | 20 | 20 |
| Ebecryl 284N: Urethane diacrylate (%) | 30 | — | — |
| Ebecryl 1290: Urethane hexaacrylate (%) | — | 30 | — |
| Ebecryl 8411: Urethane diacrylate (%) | — | — | 30 |
| Luperox P: t-butylperoxybenzoate (phm) | 1.5 | 1.5 | 1.5 |
| Adhesion without imbibing photochromics | | | |
| Dry | PASS | PASS | PASS |
| Wet | PASS | PASS | PASS |
| Adhesion after imbibing photochromics | | | |
| Dry | PASS | PASS | fail |
| Wet | PASS | PASS | na |
| Photochromic Performance | | | |
| % T initial | 85.2 | 88.0 | 81.2 |
| % T dark | 47.0 | none | 20.2 |

This II. Second Example Set and Table 4 indicates that routine experimentation has some limited effect in improving either adhesion or photochromic performance, but not both. These trials were expanded to blend in other polymers like PMMA, PVA and CAB, but similar poor results were obtained.

Ebecryl® 284-N is the trade name for an aliphatic urethane diacrylate diluted 12% by weight with the reactive diluent 1,6-hexanediol diacrylate (HDODA). Ebecryl 284-N and HDODA are available from Cytec Surface Specialties, Inc. of Smyrna, Ga. HDODA is also referred to as hexamethylene diacrylate having CAS No. 13048-33-4. Some of its properties are: Color, Gardner scale, max. of 2; Viscosity of 1,900-2,300 cP at 60 degrees C.; a % NCO, max. of 0.2; Density of 1.18 g/ml at 25 degrees C.; Functionality of 2 (a theoretical determination based on the undiluted oligomer); Oligomer of 12% by weight; Tensile strength of 5,900 psi; Elongation at break of 58%; Boiling point of >100 degrees C.; Vapor pressure of <0.01 h Pa @ 20 degrees C.; and a Glass Transition temperature of 50 degrees C.

Ebecryl® 1290 is the trade name for a hexafunctional aliphatic urethane acrylate that exhibits very fast cure response when exposed to ultraviolet light (UV) or electron beam (EB). The product is made from acrylated aliphatic urethane in a range of 50 to 60% combined with acrylated polyol in a range of 40 to 50% by weight. Ebecryl® 1290 is available from Cytec Surface Specialties, Inc. of Smyrna, Ga. Some of its properties are: Color, Gardner scale, max. of 1; Viscosity of 1,800-2,200 cP at 60 degrees C.; Density 1.19 g/ml at 25 degrees C.; Functionality of 6 (a theoretical determination based on the undiluted oligomer); Tensile strength of 6,700 psi; Elongation at break of 2%; Boiling point of >100 degrees C.; Vapor pressure of <0.013 h Pa @ 20 degrees C.; and a Glass Transition temperature of 69 degrees C.

Ebecryl® 8411 is the trade name for an aliphatic urethane diacrylate (aka acrylated urethane) diluted 20% by weight with the reactive diluent isobornyl acrylate (IBOA). Ebecryl 8411 and IBOA are available from Cytec Surface Specialties, Inc. of Smyrna, Ga. IBOA has CAS NO. 5888-33-5. Some of the properties of Ebecryl 8411 are: Color, Gardner scale, max. of 1; Viscosity of 3,400-9,500 cP at 65.5 degrees C.; a % NCO, max. of 0.2; Density of 1.13 g/ml at 25 degrees C.; Functionality of 2 (a theoretical determination based on the undiluted oligomer); Oligomer of 80% by weight; Tensile strength of 1,170 psi; Elongation at break of 320%; Young's modulus of 1,280 psi; Boiling point of >100 degrees C.; Vapor pressure of <0.013 h Pa @ 20 degrees C.; and a Glass Transition temperature of −18 degrees C.

III. Third Example Set

We now look at the examples of the invention. Example 9 contains Carbothane 3575A aliphatic polycarbonate-based TPU from Estane. Cobalt naphthenate was carefully weighed out into a vial. MMA was then added and the vial was gently swirled to dissolve the cobalt napthenate. Carbothane 3575A was added and the solution was heated to ~50 C and stirred until dissolved. MMA is an excellent solvent for both the cobalt naphthenate and Carbothane 3575A. SR603 then SR399 were added and mixed thoroughly. CN965 was then added and mixed until well mixed. The organic peroxide Luperox P was added last. Example 10 is a repeat example of 9. Example 11 is a comparative example which does not contain any Carbothane 3575A. Table 5 below shows examples 9 and 10, both containing the Carbothane 3575A, display excellent adhesion after imbibing with photochromics. Also, adhesion is preserved even after 200 hours of SunTest exposure. Additionally, the photochromic performance is comparable to the comparative example which does not contain Carbothane 3575A. Example 11 comparative example fails adhesion after imbibing but shows good photochromic performance.

TABLE 5

Adhesion Performance of the Invention

| | Sample | | |
|---|---|---|---|
| | 11 | 9 | 10 |
| cobalt naphthenate (phm) | 0.25 | 0.25 | 0.25 |
| MMA: methylmethacrylate (%) | 20 | 20 | 20 |
| Carbothane 3575A (phm) | — | 1.0 | 1.0 |
| SR603: PEG (400) DMA (%) | 30 | 30 | 30 |
| SR399: dipentaerythritol pentaacrylate (%) | 20 | 20 | 20 |
| CN965: Urethane diacrylate (%) | 30 | 30 | 30 |
| Luperox P: t-butylperoxybenzoate (phm) | 1.5 | 1.5 | 1.5 |
| Adhesion without imbibing photochromics | | | |
| Dry | PASS | PASS | PASS |
| Wet | PASS | PASS | PASS |
| Adhesion after imbibing photochromics | | | |
| Dry | fail | PASS | PASS |
| Wet | na | PASS | PASS |
| Photochromic Performance | | | |
| % T initial | 82.7 | 83.0 | 83.6 |
| % T dark | 21.1 | 20.5 | 20.4 |

Carbothane® is the trade name for a family of aliphatic, polycarbonate-based TPUs available from the Estane® line of Lubrizol Corporation of Cleveland, Ohio. The family is characterized by excellent oxidative stability and chemical stability. Some of the properties of Carbothane PC-3575A are: Durometer 73A Shore Hardness; Specific gravity of 1.15; Flexural modulus of 620 psi; Ultimate Tensile of 5,300 psi; Ultimate elongation of 470 psi; Tensile of psi at 100% elongation; Tensile of 500 at 200% elongation; Tensile of 900 at 300% elongation; and Mold shrinkage of 0.008-0.012 in/in.

We now look at yet another example of this invention. Example 12 is the same as 9 except that BzA (Tg=6° C.) replaced MMA. The benzyl acrylate is an good solvent for the cobalt naphthenate and the Carbothane 3575A. Table 6 below shows 12 to have excellent adhesion. Also, adhesion is preserved even after 200 hours of SunTest exposure. We also see an improvement in the photochromic performance with darkening at 18.4% T. Example 13 comparative example without Carbothane 3575A fails adhesion after imbibing.

TABLE 6

Adhesion Performance of the Invention

| | Sample | |
|---|---|---|
| | 13 | 12 |
| cobalt naphthenate (phm) | 0.25 | 0.25 |
| BzA: benzyl acrylate (%) | 20 | 20 |
| Carbothane 3575A (phm) | — | 1.0 |
| SR603: PEG (400) DMA (%) | 30 | 30 |
| SR399: dipentaerythritol pentaacrylate (%) | 20 | 20 |
| CN965: Urethane diacrylate (%) | 30 | 30 |
| Luperox P: t-butylperoxybenzoate (phm) | 1.5 | 1.5 |
| Adhesion without imbibing photochromics | | |
| Dry | PASS | PASS |
| Wet | PASS | PASS |
| Adhesion after imbibing photochromics | | |
| Dry | fail | PASS |
| Wet | na | PASS |
| Photochromic Performance | | |
| % T initial | 81.2 | 82.6 |
| % T dark | 18.6 | 18.4 |

Yet another example of this invention, example 14 the same as 9 except that BzMA (Tg=54° C.) replaced MMA. The benzyl methacrylate is an good solvent for the cobalt naphthenate and the Carbothane 3575A. Table 7 below shows 14 to have excellent adhesion after imbibing. Also, adhesion is preserved even after 200 hours of SunTest exposure. The comparative example 15 fails adhesion after being imbibed with photochromics.

TABLE 7

Adhesion Performance of the Invention

| | Sample | |
|---|---|---|
| | 15 | 14 |
| cobalt naphthenate (phm) | 0.25 | 0.25 |
| BzMA: Benzyl methacrylate (%) | 20 | 20 |
| Carbothane 3575A (phm) | — | 1.0 |
| SR603: PEG (400) DMA (%) | 30 | 30 |
| SR399: dipentaerythritol pentaacrylate (%) | 20 | 20 |
| CN965: Urethane diacrylate (%) | 30 | 30 |
| Luperox P: t-butylperoxybenzoate (phm) | 1.5 | 1.5 |
| Adhesion without imbibing photochromics | | |
| Dry | PASS | PASS |
| Wet | PASS | PASS |
| Adhesion after imbibing photochromics | | |
| Dry | fail | PASS |
| Wet | na | PASS |
| Photochromic Performance | | |
| % T initial | 80.8 | 83.8 |
| % T dark | na | 21.1 |

As can be seen, the TPU is effective in enhancing coating adhesion and results in good photochromic performance. It is shown to be compatible with MMa, BzA, and BzMA blends of acrylate monomers. The acrylate components can be present is varying amounts to provide flexibility in material selection, while maintaining performance and optical quality. The imbibable segmented lens can be treated with a variety of photochromic dyes, for example, naphthopyrans, fulgides, benzopyrans, fulgimides, spironaphthopyrans, spirobenzoxazines, spironaphthoxazines, spirobenzopyrans, and combinations. The dyes can be blended to achieve different performance or cosmetic characteristics.

Having described preferred embodiments for lens manufacturing, materials used therein and methods for processing the same (which are intended to be illustrative and not limiting), it is noted that modifications and variations can be made by persons skilled in the art in light of the above teachings. It is therefore understood that changes may be made in the particular embodiments of the invention disclosed which are within the scope and spirit of the invention as outlined by the appended claims.

Having thus described the invention with the details and particularity required by the patent laws, what is claimed and desired protected by Letters Patent is set forth in the appended claims:

1. A method for forming a photochromically-enabled bifocal ophthalmic lens by incorporating a thermoplastic polyurethane (TPU) therein, comprising the steps of:

injecting molten thermoplastic polycarbonate (PC) resin into an edge-gated cavity of an injection molding machine having a vertical equipment axis to provide a lens substrate;
applying an acrylate-based coating composition onto the lens substrate which cures to form an imbibable bifocal surface while still in the injection molding machine; and
imbibing a photochromic dye solution into the surface;
wherein the acrylate-based composition contains an adhesion enhancer comprising a TPU so that coating-to-substrate integrity is maintained following said imbibing step.

2. The method of claim 1, wherein said injecting step comprises providing a single vision (SV) lens substrate, and said applying step comprises overmolding.

3. The method of claim 1, wherein said injecting step comprises providing a bifocal lens substrate.

4. The method of claim 1, wherein said applying step comprises:
depositing an unpressurized full metered charge of the composition on to the upwardly-facing convex surface of the lens substrate; and
clamping down an upper mold half to form a bifocal lens cavity.

5. The method of claim 1, wherein the coating composition comprises at least 90% by weight of a blend of acrylate-based thermoset materials, and less than 5 phm TPU parts per hundred parts of monomer (phm).

6. The method of claim 5, wherein the coating composition is devoid of dyes which are selected from regular dyes, photochromic dyes, dichroic dyes and a combination thereof.

7. The method of claim 5, wherein the coating composition comprises less than about 2 TPU phm, wherein the TPU is a polycarbonate-based TPU.

8. The method of claim 5, wherein the TPU is an aliphatic polycarbonate-based TPU.

9. The method of claim 5, wherein the photochromically-enabled bifocal ophthalmic lens has an % T initial above about 80.

10. The method of claim 5, wherein the photochromically-enabled bifocal ophthalmic lens has a % T dark around 20.

11. The method of claim 1, wherein said applying step comprises:
formulating the coating composition by dissolving a metal salt and the TPU in a solvent blend comprising:
(1) a monofunctional (meth)acrylate;
(2) a multifunctional (meth)acrylate;
(3) a difunctional (meth)acrylate;
(4) an aliphatic urethane diacrylate; and
adding an initiator.

12. The method of claim 1, wherein said applying step comprises:
formulating the coating composition by dissolving a metal salt, a dye, and the TPU in a solvent blend comprising:
(1) a monofunctional (meth)acrylate;
(2) a multifunctional (meth)acrylate;
(3) a difunctional (meth)acrylate;
(4) an aliphatic urethane diacrylate; and
adding an initiator.

13. The method of claim 12, wherein said dye is selected from regular dye, photochromic dye, dichroic dye and a combination thereof.

* * * * *